(12) United States Patent
Hutchins et al.

(10) Patent No.: US 11,766,999 B2
(45) Date of Patent: Sep. 26, 2023

(54) PARKING BRAKE APPARATUS AND METHOD THEREFOR

(71) Applicant: Bendix Commercial Vehicle Systems LLC, Avon, OH (US)

(72) Inventors: Christopher H Hutchins, Bay Village, OH (US); Daniel P Zula, North Ridgeville, OH (US)

(*) Notice: Subject to any disclaimer, the term of this patent is extended or adjusted under 35 U.S.C. 154(b) by 0 days.

(21) Appl. No.: 17/931,157

(22) Filed: Sep. 12, 2022

(65) Prior Publication Data

US 2023/0001891 A1 Jan. 5, 2023

Related U.S. Application Data

(62) Division of application No. 16/709,280, filed on Dec. 10, 2019, now Pat. No. 11,623,619.

(51) Int. Cl.
*B60T 7/12* (2006.01)
*B60T 13/66* (2006.01)

(52) U.S. Cl.
CPC .............. *B60T 7/12* (2013.01); *B60T 13/662* (2013.01); *B60T 2201/06* (2013.01); *B60T 2250/04* (2013.01); *B60T 2260/08* (2013.01)

(58) Field of Classification Search
CPC ...... B60T 7/12; B60T 13/662; B60T 2260/08; B60T 2250/04; B60T 2201/06
See application file for complete search history.

(56) References Cited

U.S. PATENT DOCUMENTS

| 8,649,948 | B2* | 2/2014 | Yanagida | B60T 7/122 |
| | | | | 701/70 |
| 2013/0226425 | A1* | 8/2013 | Oliveira | B60T 7/12 |
| | | | | 701/70 |
| 2018/0148021 | A1* | 5/2018 | Mannherz | B60T 13/74 |
| 2018/0290655 | A1* | 10/2018 | Sato | B60L 15/2018 |
| 2019/0135244 | A1* | 5/2019 | Shiozawa | B60T 8/329 |
| 2019/0276025 | A1* | 9/2019 | Asano | B60W 10/04 |

FOREIGN PATENT DOCUMENTS

DE 10104498 B4 * 9/2014

* cited by examiner

*Primary Examiner* — Pamela Rodriguez
(74) *Attorney, Agent, or Firm* — Cheryl L. Greenly; Brian E. Kondas

(57) ABSTRACT

A parking brake apparatus for a vehicle includes a parking brake controller controlling a parking brake system and arranged to obtain one or more input signals indicative of one or more actions from one or more vehicle systems other than the parking braking system. The parking brake controller is also arranged to provide one or more control signals to be applied to components of the parking brake system to apply parking brakes based upon an adaptive time delay to prevent a vehicle rollaway when the one or more input signals are indicative of the one or more actions meeting respective one or more predetermined conditions.

3 Claims, 6 Drawing Sheets

PARKING BRAKE APPARATUS AND METHOD THEREFOR

CROSS REFERENCE TO RELATED APPLICATIONS

The present application is a divisional of the pending U.S. patent application Ser. No. 16/709,280 filed on Dec. 10, 2019, the entire disclosure of which is incorporate fully herein by reference.

BACKGROUND

The present application relates to vehicle parking systems, and is particularly directed to a parking brake apparatus and method therefor, such as for a parking system of a commercial truck.

Vehicle parking systems for commercial trucks are known. One type of vehicle parking system for trucks is an electronic parking system. In some electronic parking systems, the parking brake is automatically applied when the truck driver is detected as having exited the driver's seat but not exiting the truck cab. A seat pressure switch or a seat belt switch is usually used to detect presence of a person in the driver's seat. Some trucks include a hill start assist system in which the brake is automatically applied when the truck is stopped on an uphill inclined roadway. Accordingly, those skilled in the art continue with research and development efforts in the field of parking systems of a vehicle, such as a commercial truck, that has an electronic parking system, and may or may not have a hill start assist system.

SUMMARY

In accordance with one embodiment, a parking brake apparatus is provided for a vehicle having components of a parking brake system. The parking brake apparatus comprises a parking brake controller arranged to (i) obtain a first signal indicative of whether a hill start assist system is installed on the vehicle, and (ii) provide one or more control signals to be applied to components of the parking brake system to apply parking brakes when the first signal is indicative of a hill start assist system installed on the vehicle is present and a second signal indicative of the hill start assist system being activated is received.

In accordance with another embodiment, a parking brake apparatus is provided for a vehicle having parking brakes and a hill assist system installed on the vehicle. The parking brake apparatus comprises means for, when the hill start system is not activated, applying the parking brakes after a first predetermined amount of time from when a parking brake application signal is received to prevent a vehicle rollaway. The parking brake apparatus also comprises means for, when the hill start assist system is activated, applying the parking brakes after a second predetermined amount of time from when a parking brake application signal is received to prevent a vehicle rollaway, wherein the second predetermined amount of time is different from the first predetermined amount of time.

In accordance with yet another embodiment, a program storage medium readable by a computer having a memory is provided. The medium tangibly embodies one or more programs of instructions executable by the computer to perform method steps for processing signals of a vehicle having components of a parking brake system. The method comprises the step of applying a first parking brake control algorithm when a select one of a hill start assist system, electric powertrain, automated transmission, and advanced driver assistance system is installed on the vehicle. The method also comprises the step of applying a second parking brake control algorithm that is different from the first parking brake control algorithm when the select one of a hill start assist system, electric powertrains, automated transmission, and advanced driver assistance system is not installed on the vehicle.

In accordance with still another embodiment, a method is provided for a vehicle having parking brakes and a parking brake controller. The method comprises installing onto the parking brake controller a first parking brake control algorithm that has executable program instructions to apply the parking brakes based upon a first predetermined time delay. The method also comprises installing onto the parking brake controller a second parking brake control algorithm that has executable program instructions to apply the parking brakes based upon a second predetermined time delay that is different from the first predetermined time delay. The first parking brake control algorithm and the second parking brake control algorithm are functionally operable with other controllers of the vehicle without having to modify any software associated with the other controllers.

In accordance with another embodiment, a parking brake apparatus is provided for a vehicle having components of a parking brake system. The parking brake apparatus comprises a parking brake controller arranged to (i) obtain one or more input signals indicative of one or more actions from one or more vehicle systems other than the parking braking system, and (ii) provide one or more control signals to be applied to components of the parking brake system to apply parking brakes based upon an adaptive time delay to prevent a vehicle rollaway when the one or more input signals are indicative of the one or more actions meeting respective one or more predetermined conditions.

DETAILED DESCRIPTION

The present application is directed to a parking brake apparatus for a vehicle such as a commercial truck. The specific construction of the parking brake apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1A:
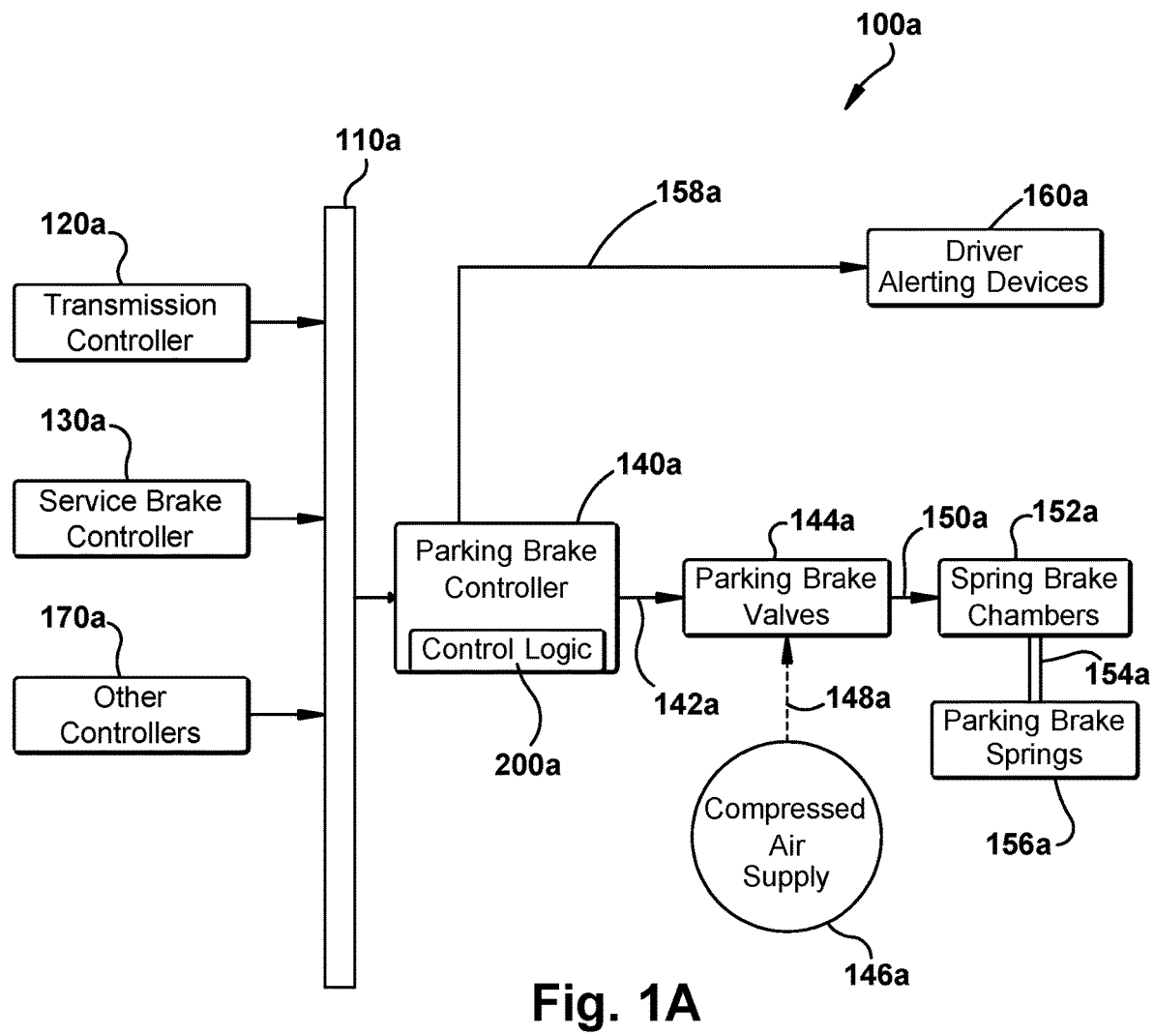
FIG. 1A is a schematic block diagram showing an example parking brake apparatus constructed in accordance with an embodiment.

Referring to FIG. 1A, a schematic block diagram showing an example parking brake apparatus 100a constructed in accordance with an embodiment is illustrated. In FIG. 1A, electrical line connections are shown as solid lines, pneumatic lines connections are shown as dashed lines, and mechanical couplings are shown as double solid lines.

Parking brake apparatus 100a includes a controller area network (CAN) bus 110a to which a number of vehicle devices are connected to communicate with each other. The CAN bus 110a may be in a standardized serial communication format, such as SAE J1939, or in a proprietary format. It is conceivable that some or all of the vehicle devices be hardwired for communication instead of using the CAN bus 110a for communication.

Vehicle devices that may be connected to the CAN bus 110a include, but are not limited to, a transmission controller 120a, a service brake controller 130a, a parking brake controller 140a, and other controllers 170a. The transmission controller 120a is in the form of an electronic controller unit that may provide to the CAN bus 110a a variety of signals including configuration messages, diagnostic status, clutch status (e.g., open/closed), gear status, and transmission-specific signals such as "ready to release brakes". Similarly, the service brake controller 130a is in the form of an electronic controller unit that may provide to the CAN bus 110a a variety of signals including configuration messages, diagnostic status, brake lamp status, service brake pressure, and brake-specific signals such an "ok to release brakes" acknowledgement.

The other controllers 170a may include an engine controller which controls the vehicle engine. As another example, the other controllers 170a include a headway controller, such as used in a radar-based adaptive cruise control systems.

The parking brake controller 140a is in the form of an electronic controller unit that is arranged to monitor signals on the CAN bus 110a to provide one or more control signals to apply parking brakes based upon control logic 200a that is stored in a data storage unit of the parking brake controller 140a. In particular, the parking brake controller 140a provides one or more signals on line 142a to control operation of parking brake valves 144a. Compressed air supply 146a provides a source of compressed air in line 148a to parking brake valves 144a. Parking brake valves 144a are controlled by parking brake controller 140a to vary pneumatic pressure in line 150a to one or more chambers of spring brake chambers 152a.

More specifically, when the parking brakes of the vehicle are applied, the parking brake controller 140a provides signals on line 142a that are applied to parking brake valves 144a so as to exhaust air in one or more chambers of spring brake chambers 152a. The spring brake chambers 152a are operatively coupled via line 154a in known manner to parking brake springs 156a. When air in spring brake chambers 152a is exhausted and system air pressure drops to less than about 45 psi to 60 psi, parking brake springs 156a are activated to apply the vehicle parking brakes, as is known. Structure and operation of parking brake controller 140a and parking brake valves 144a for controlling operation of spring brake chambers 152a and parking brake springs 156a of the vehicle are conventional and, therefore, will not be further described.

Parking brake controller 140a also provides a number of signals on line 158a to one or a number of driver alerting devices 160a. The driver alerting devices 160a may comprise any number of devices that can provide any combination of signals including a visual signal, an audio signal, and a haptic signal to alert the vehicle driver. Other devices that provide different types of signals to alert the vehicle driver are possible.

In accordance with an aspect of the present disclosure, the control logic 200a enables the parking brake controller 140a to provide one or more control signals on line 142a to apply the parking brakes to prevent a vehicle rollaway when a first signal that is indicative of a hill start assist system installed on the vehicle is detected to be present and a second signal that is indicative of the hill start assist system being activated is received on the CAN bus 110a from another device or controller (e.g., the transmission controller 120a or the service brake controller 130a). The feature of applying the vehicle parking brakes to prevent a vehicle rollaway is referred to herein as the "anti-rollaway" feature.

A hill start assist system is a driver assistance system in which applied service brakes are maintained for a predetermined time period as the vehicle driver switches from applying pressure to the foot-brake pedal to the foot-gas pedal when the vehicle is on an inclined roadway. When sensors on the vehicle detect that the vehicle is on an incline, the hill start assist system is activated to maintain the service brakes applied for the predetermined time period. Structure and operation of hill start assist systems are conventional and, therefore, will not be further described.

In some embodiments, the first signal is embedded into a memory associated with the parking brake controller 140a, and is therefore obtained by retrieving the embedded signal. In some embodiments, the first signal is provided by another device or controller, and is therefore obtained via the CAN bus 110a. The parking brake controller 140a is configured and arranged to assume that no hill start assist system is installed on the vehicle when a first signal is absent. The vehicle driver may be provided with an indication that a hill start assist system is installed on the vehicle when the first signal is present, and the second signal is obtained from the CAN bus 110a. When this occurs, the vehicle driver is provided with an indication thereof in the form of a visual signal, an audible signal, or a haptic signal on the driver alerting devices 160a.

Figure 2A:
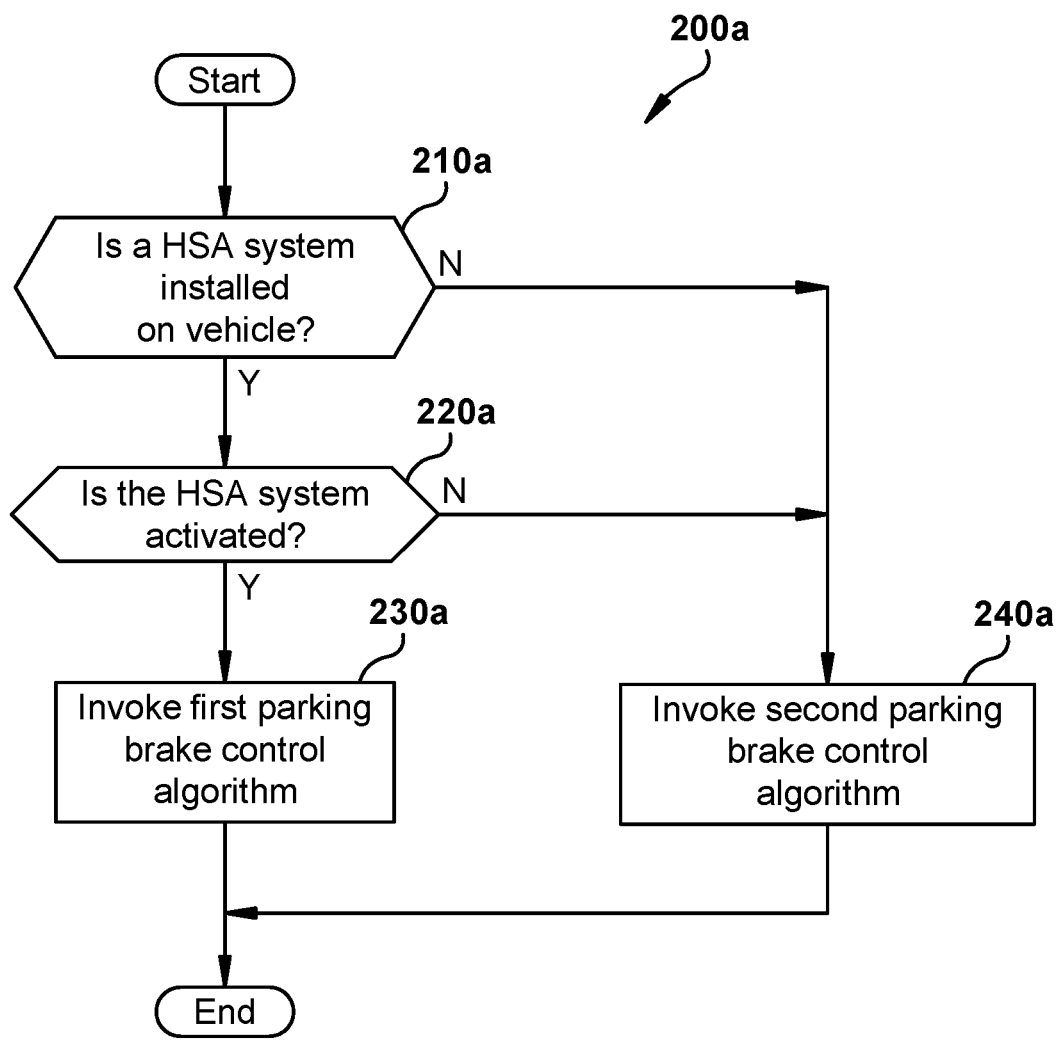
FIG. 2A is a flow diagram depicting an example method of operating the parking brake apparatus of FIG. 1A in accordance with an embodiment.

Referring to FIG. 2A, a flow diagram 200a depicts an example method of operating the parking brake apparatus 100a of FIG. 1A in accordance with an embodiment. The flow diagram 200a is an embodiment of the control logic 200a shown in FIG. 1A, and will be referred to herein as "control logic 200a".

The control logic 200a in block 210a begins by making a determination a as to whether a hill start assist system is installed on the vehicle. As previously described, the control logic 200a may perform this by looking at the memory of the parking brake controller 140a or at the CAN bus 110a for the first signal that is indicative of a hill start assist system installed on the vehicle. If the determination in block 210a is affirmative (i.e., a hill start assist system is installed on the vehicle), the process of control logic 200a proceeds to block 220a. In block 220a, a determination is made as to whether the hill start assist system is being activated. As previously described, the control logic 200a may perform this by looking at the CAN bus 110a for the second signal from another device or controller.

If the determination in block 220a is affirmative (i.e., the hill start assist system is being activated), the process proceeds to block 230a in which a first parking brake control algorithm (which may comprise a time-delay based parking brake control algorithm) is invoked. When this occurs, the parking brakes are applied after a first predetermined amount of time has elapsed since when the parking brake controller 140a obtained both the first and second signals. More specifically, the parking brake controller 140a executes program instructions of the first parking brake control algorithm when the first signal that is indicative of a hill start assist system installed on the vehicle is detected to be present and the second signal is received. The process of control logic 200a then ends.

However, if the determination in block 220a is negative (i.e., the hill start assist system is not being activated), the process of control logic 200a proceeds to block 240a in which a second parking brake control algorithm (which may comprise a standard parking brake control algorithm) is invoked. When this occurs, the parking brakes are applied after a second predetermined amount of time has elapsed since when the parking brake controller 140a detected only the first signal. The parking brake controller 140a executes program instructions of the second parking brake control algorithm when the first signal that is indicative of a hill start assist system installed on the vehicle is absent. The process of control logic 200a then ends.

The second predetermined amount of time is different from the first predetermined amount of time. In some embodiments, the second predetermined amount of time is greater than the first predetermined amount of time. For example, the first predetermined amount of time is about five (5) seconds and the second predetermined amount of time is about thirty (30) seconds. In some embodiments, the second predetermined amount of time may be zero (i.e., no time delay).

Figure 1B:
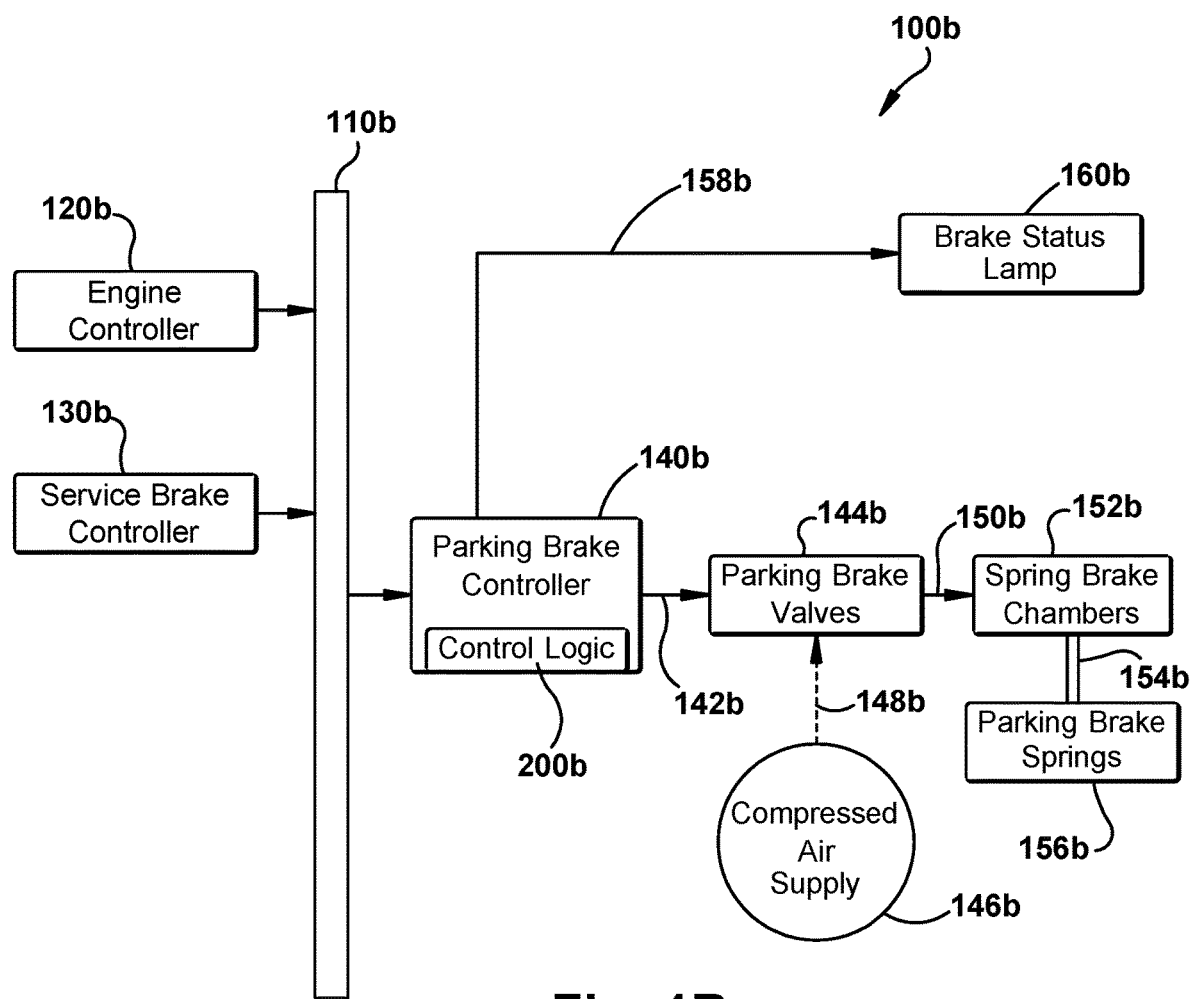
FIG. 1B is a schematic block diagram showing an example parking brake apparatus constructed in accordance with another embodiment

Referring to FIG. 1B, a schematic block diagram showing an example parking brake apparatus 100b constructed in accordance with an embodiment is illustrated. In FIG. 1B, electrical line connections are shown as solid lines, pneumatic lines connections are shown as dashed lines, and mechanical couplings are shown as double solid lines.

Parking brake apparatus 100b includes a controller area network (CAN) bus 110b to which a number of vehicle devices are connected to communicate with each other. The CAN bus 110b may be in a standardized serial communication format, such as SAE J1939, or in a proprietary format. It is conceivable that some or all of the vehicle devices be hardwired for communication instead of using the CAN bus 110b for communication.

Vehicle devices that may be connected to the CAN bus 110b include, but are not limited to, an engine controller 120b, a service brake controller 130b, and a parking brake controller 140b. The engine controller 120b is in the form of an electronic controller unit that may provide to the CAN bus 110b a variety of signals including configuration messages, diagnostic status, engine RPM, engine status, and engine-specific signals such as torque demand. Similarly, the service brake controller 130b is in the form of an electronic controller unit that may provide to the CAN bus 110b a variety of signals including configuration messages, diagnostic status, brake lamp status, service brake pressure, and brake-specific signals such an "ok to release brakes" acknowledgement.

The parking brake controller 140b is in the form of an electronic controller unit that is arranged to monitor signals on the CAN bus 110b to provide one or more control signals to apply parking brakes based upon control logic 200b that is stored in a data storage unit of the parking brake controller 140b. In particular, the parking brake controller 140b provides one or more signals on line 142b to control operation of parking brake valves 144b. Compressed air supply 146b provides a source of compressed air in line 148b to parking brake valves 144b. Parking brake valves 144b are controlled by parking brake controller 140b to vary pneumatic pressure in line 150b to one or more chambers of spring brake chambers 152b.

More specifically, when the parking brakes of the vehicle are applied, the parking brake controller 140b provides signals on line 142b that are applied to parking brake valves 144b so as to exhaust air in one or more chambers of spring brake chambers 152b. The spring brake chambers 152b are operatively coupled via line 154a in known manner to parking brake springs 156b. When air in spring brake chambers 152b is exhausted and system air pressure drops to less than about 45 psi to 60 psi, parking brake springs 156b are activated to apply the vehicle parking brakes, as is known. Structure and operation of parking brake controller 140b and parking brake valves 144b for controlling operation of spring brake chambers 152b and parking brake springs 156b of the vehicle are conventional and, therefore, will not be further described. Parking brake controller 140b also provides a number of signals on line 158a to a brake status lamp 160b.

In accordance with an aspect of the present disclosure, the control logic 200b enables the parking brake controller 140b to provide one or more control signals on line 142b to apply the parking brakes based upon an adaptive time delay to prevent a vehicle rollaway when one or more actions from one or more vehicle systems other than the parking braking system meet respective one or more predetermined conditions. One or more input signals are indicative of the one or more actions from the one or more vehicle systems other than the parking braking system.

In an example embodiment, the one or more input signals comprise (i) a first signal indicative of vehicle speed being less than a predetermined speed threshold, (ii) a second signal indicative of service brakes of the vehicle being applied, and (iii) a third signal indicative of accelerator pedal of the vehicle being applied, as will be described in more detail with reference to FIG. 2B.

Figure 2B:
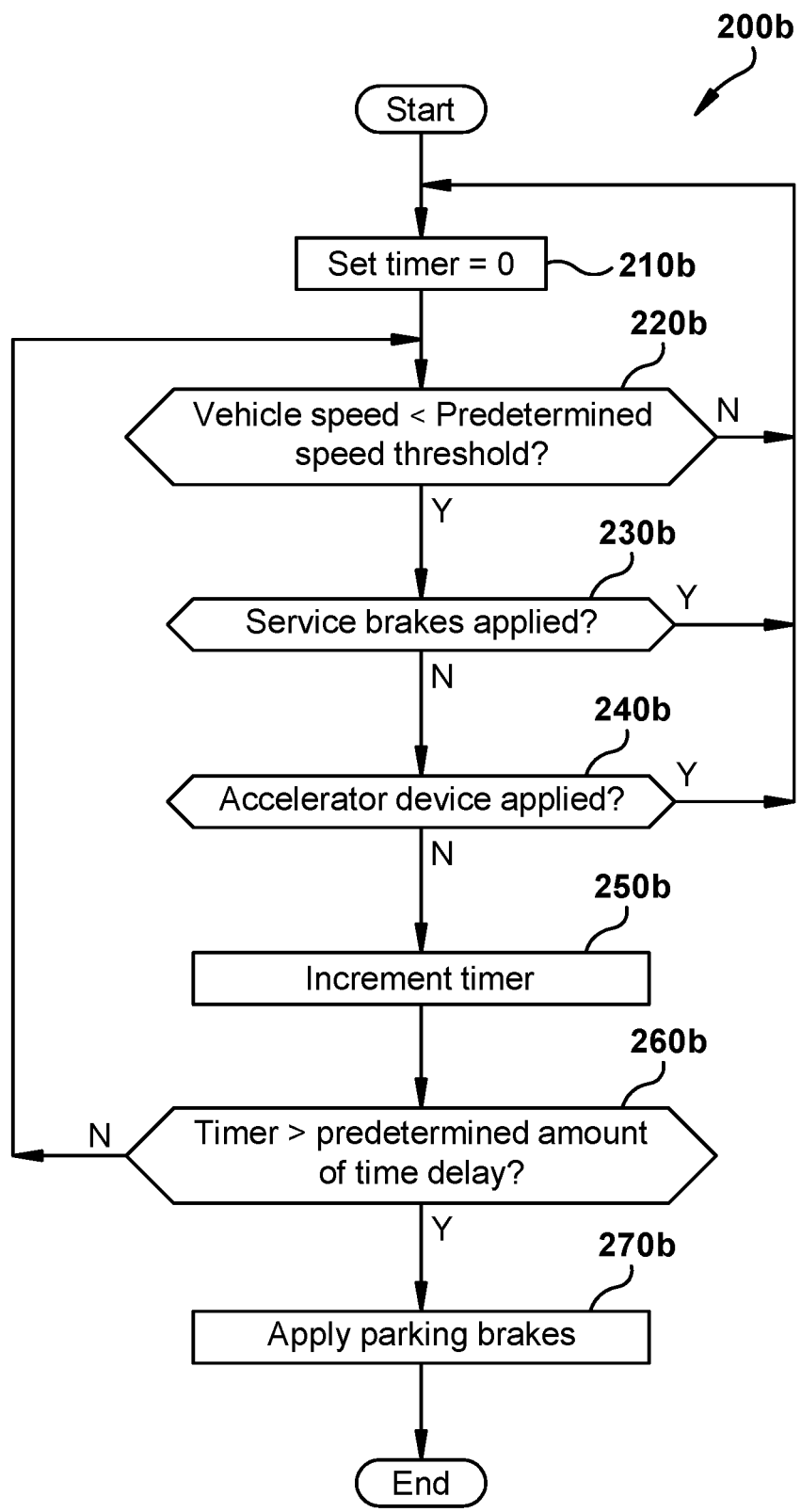
FIG. 2B is a flow diagram depicting an example method of operating the parking brake apparatus of FIG. 1B in accordance with an embodiment.

Referring to FIG. 2B, a flow diagram 200b depicts an example method of operating the parking brake apparatus 100b of FIG. 1B in accordance with an embodiment. The flow diagram 200b is an embodiment of the control logic 200b shown in FIG. 1B, and will be referred to herein as "control logic 200b".

The control logic 200b in block 210b begins by setting a timer equal to zero. Then in block 220b, a determination is made as to whether the ground speed of the vehicle is less than a predetermined speed threshold. If the determination in block 220b is negative (i.e., the vehicle speed is not less than the predetermined speed threshold), the process of control logic 200b returns back to block 210b to reset the timer to zero. However, if the determination in block 220b is affirmative (i.e., the vehicle speed is less than the predetermined speed threshold), the process of control logic 200b proceeds to block 230b.

In block 230b, a determination is made as to whether the service brakes (e.g., the foot-brake pedal) of the vehicle are applied. If the determination in block 230b is affirmative (i.e., the service brakes are applied), the process of control logic 200b returns back to block 210b to reset the timer to zero. However, if the determination in block 230b is negative (i.e., the service brakes are not applied), the process of control logic 200b proceeds to block 240b.

In block 240b, a determination is made as to whether the accelerator device (e.g., the foot-gas pedal) of the vehicle is applied. If the determination in block 240b is affirmative (i.e., the accelerator device is applied), the process of control logic 200b returns back to block 210b to reset the timer to zero. However, if the determination in block 240b is negative (i.e., the accelerator device is not applied), the process of control logic 200b proceeds to block 250b.

In block 250b, the timer that was set to zero back in block 210b is incremented. The amount of the time increment may be 0.10 seconds, for example. A determination is then made in block 260b as to whether the amount of time in the timer is greater than a predetermined amount of time delay. The predetermined amount of time delay is an adaptive time delay that can be either increased or decreased depending upon the type or types of (i) the one or more input signals, (ii) the one or more actions and respective one or more predetermined conditions, and (iii) the one or more vehicle systems other than the parking braking system.

If the determination in block 260b is negative (i.e., the amount of time in the timer is not greater than the predetermined amount of time delay), the process of control logic 200b returns back to block 220b continue monitoring the vehicle speed. However, if the determination in block 260b is affirmative (i.e., the amount of time in the timer is greater than the predetermined amount of time delay), the process of control logic 200b proceeds to block 270b to apply the parking brakes. The process of control logic 200b then ends.

It should be apparent that the above description of FIGS. 2A and 2B describes the one or more input signals comprising (i) a first signal indicative of vehicle speed being less than a predetermined speed threshold, (ii) a second signal indicative of service brakes of the vehicle being applied, and (iii) a third signal indicative of an accelerator device of the vehicle being applied. However, it is conceivable that the one or more input signals comprise (i) a first signal indicative of a hill start assist system being present on the vehicle, and (ii) a second signal indicative of the hill start assist system being activated. Accordingly, it should also be apparent that the one or more vehicle system other than the parking brake system may comprise a select one of a hill start assist system, electric powertrain, automated transmission, and advanced driver assistance system.

Figure 3:
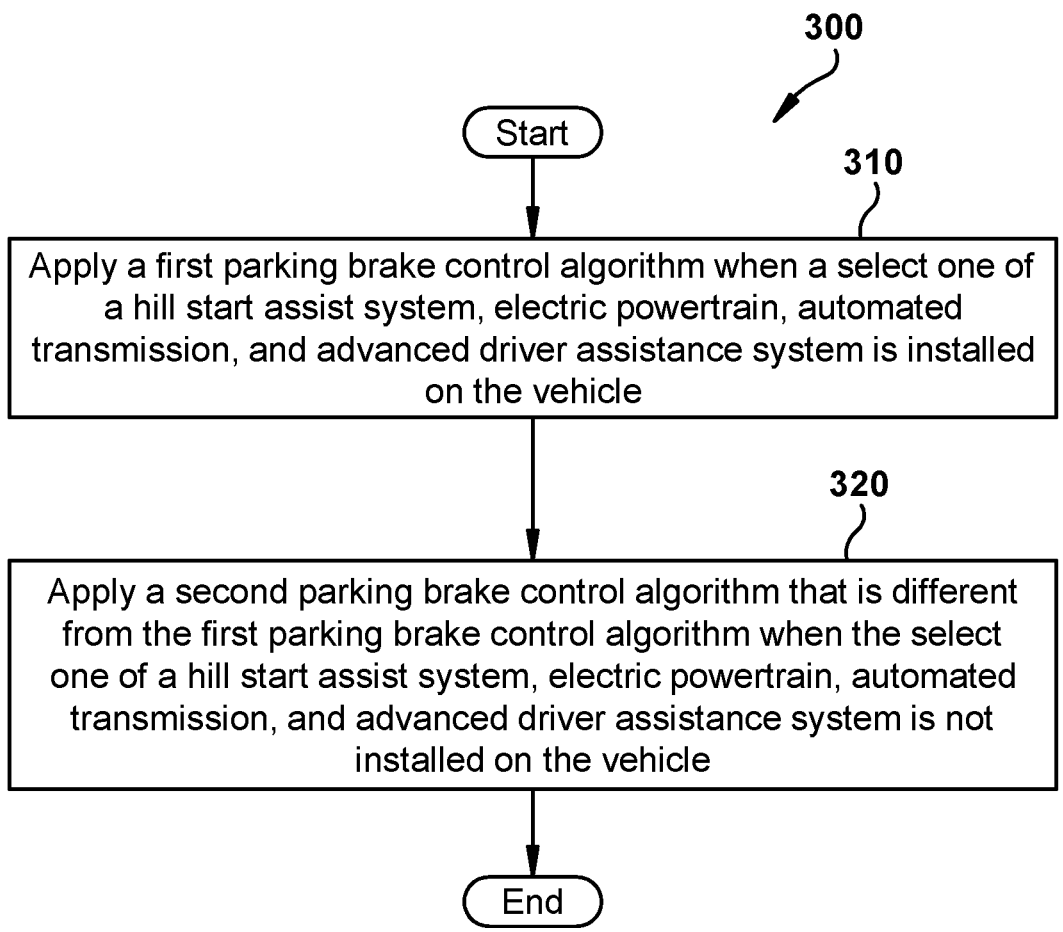
FIG. 3 is a flow diagram depicting an example method for applying a parking brake control algorithm of a vehicle having components of a parking brake system in accordance with an embodiment.

Referring to FIG. 3, a flow diagram 300 depicts an example method for applying a parking brake control algorithm of a vehicle having components of a parking brake system in accordance with an embodiment.

In block 310, a first parking brake control algorithm is applied when a select one of a hill start assist system, electric powertrain, automated transmission, and advanced driver assistance system is installed on the vehicle. The process then proceeds to block 320. In block 320, a second parking brake control algorithm that is different from the first parking brake control algorithm is applied when the select one of a hill start assist system, electric powertrain, automated transmission, and advance driver assistance system is not installed on the vehicle.

In some embodiments, the first parking brake control algorithm comprises a first time-delay based parking brake control algorithm, and the second parking brake control algorithm comprises a second time-delay based parking brake control algorithm.

In some embodiments. the select one of a hill start assist system, electric powertrain, automated transmission, and advanced driver assistance system comprises an interface device to the parking brake system.

Figure 4:
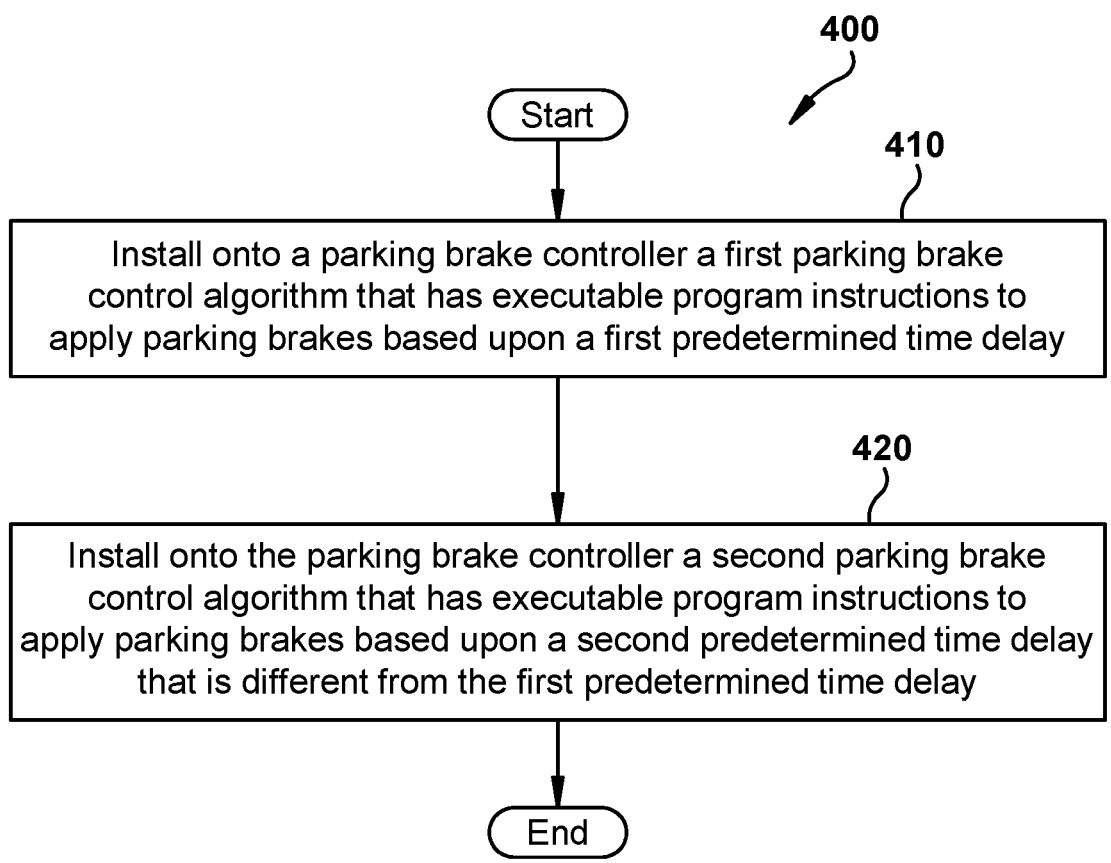
FIG. 4 is a flow diagram depicting an example method for a vehicle having parking brakes and a parking brake controller in accordance with an embodiment.

Referring to FIG. 4, a flow diagram 400 depicts an example method for a vehicle having parking brakes and a parking brake controller in accordance with an embodiment.

In block 410, a first parking brake control algorithm is installed onto a parking brake controller of the vehicle. The first parking brake control algorithm has executable program instructions to apply the parking brakes based upon a first predetermined time delay. The process proceeds to block 420.

In block 420, a second parking brake control algorithm is installed onto the parking brake controller of the vehicle. The second parking brake control algorithm has executable program instructions to apply the parking brakes based upon a second predetermined time delay that is different from the first predetermined time delay. The first parking brake control algorithm and the second parking brake control algorithm are functionally operable with other controllers of the vehicle without having to modify any software associated with the other controllers. The process then ends.

In some embodiments, the first predetermined time delay is associated with activation of a hill start assist system on the vehicle, and the second predetermined time delay is associated with non-activation of the hill start assist system on the vehicle. In some embodiments, the second predetermined time delay may be zero (i.e., no time delay).

A number of advantages result by providing a vehicle with the above-described parking brake apparatus 100a of FIG. 1A and the parking brake apparatus 100b of FIG. 1B to provide the anti-rollaway feature. One advantage is that the anti-rollaway feature on the vehicle is activated and functions as desired to prevent a vehicle rollaway even when the vehicle driver leaves the vehicle seat but does not exit the vehicle cab. Accordingly, no seat pressure switch and no seat belt switch are required on the vehicle to implement the anti-rollaway feature of the present disclosure. The result is material-cost savings since the vehicle does not have to be upgraded with an expensive seat pressure switch and/or seat belt switch.

Another advantage is that no software-integration work (e.g., analyzing embedded software, developing unique two-way communication protocols, etc.) between different controllers is required to implement the anti-rollaway feature of the present disclosure. This is because no modification of the software on other controllers and other devices is needed to implement the anti-rollaway feature.

Less requirements for certain hardware (e.g., no seat pressure switch and no seat belt switch) and less requirements for application software development means both lower material-costs and lower labor-costs. The result is lower total production costs for implementing the anti-rollaway feature of the present disclosure.

It should be apparent that the algorithms associated with the parking brake apparatus of FIG. 1 are integrated into a practical application of implementing an adjustable (i.e., an increasing up or a decreasing down) time-delay based anti-rollaway feature for vehicles. By providing an adjustable time-delay based anti-rollaway feature on a vehicle, the vehicle is able to perform optimally according to the features that are installed on the vehicle.

Program instructions for enabling each of the parking brake controllers 140a, 140b (FIGS. 1A and 1B, respectively) to perform operation steps in accordance with corresponding flow diagrams 200a, 200b (FIGS. 2A and 2B, respectively) may be embedded in memory internal to parking brake controllers 140a, 140b. Alternatively, or in addition to, program instructions may be stored in memory external to parking brake controllers 140a, 140b. As an example, program instructions may be stored in memory internal to a different electronic controller unit of the vehicle. Program instructions may be stored on any type of program storage media including, but not limited to, external hard drives, flash drives, and compact discs. Program instructions may be reprogrammed depending upon features of the particular electronic controller unit.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of one parking brake controller, it is conceivable that any number of electronic controller units may be used. Moreover, it is conceivable that any type of electronic controller unit may be used. Suitable electronic controller units for use in vehicles are known and, therefore, have not been described. Accordingly, the program instructions of the present disclosure can be stored on program storage media associated with one or more vehicle electronic controller units.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A parking brake apparatus for a vehicle having components of a parking brake system, the parking brake apparatus comprising:
    a parking brake controller arranged to (i) obtain one or more input signals indicative of one or more actions from one or more vehicle systems other than the parking braking system, and (ii) provide one or more control signals to be applied to components of the parking brake system to apply parking brakes based upon an adaptive time delay to prevent a vehicle rollaway when the one or more input signals are indicative of the one or more actions meeting respective one or more predetermined conditions, wherein the one or more input signals indicative of one or more actions from one or more vehicle systems other than the parking braking system comprise (i) a first signal indicative of a hill start assist system being present on the vehicle, (ii) a second signal indicative of the hill start assist system being activated.

2. A parking brake apparatus according to claim 1, wherein the one or more input signals indicative of one or more actions from one or more vehicle systems other than the parking braking system comprise (i) a first signal indicative of vehicle speed being less than a predetermined speed threshold, (ii) a second signal indicative of service brakes of the vehicle being applied, and (iii) a third signal indicative of an accelerator device of the vehicle being applied.

3. A parking brake apparatus according to claim 1, wherein the adaptive time delay is either increased or decreased depending upon the type or types of (i) the one or more input signals, (ii) the one or more actions and respective one or more predetermined conditions, and (iii) the one or more vehicle systems other than the parking braking system.

* * * * *